Aug. 21, 1956  M. SEYMOUR  2,759,866
METHOD OF MAKING WALL COVERING
Filed Dec. 17, 1952
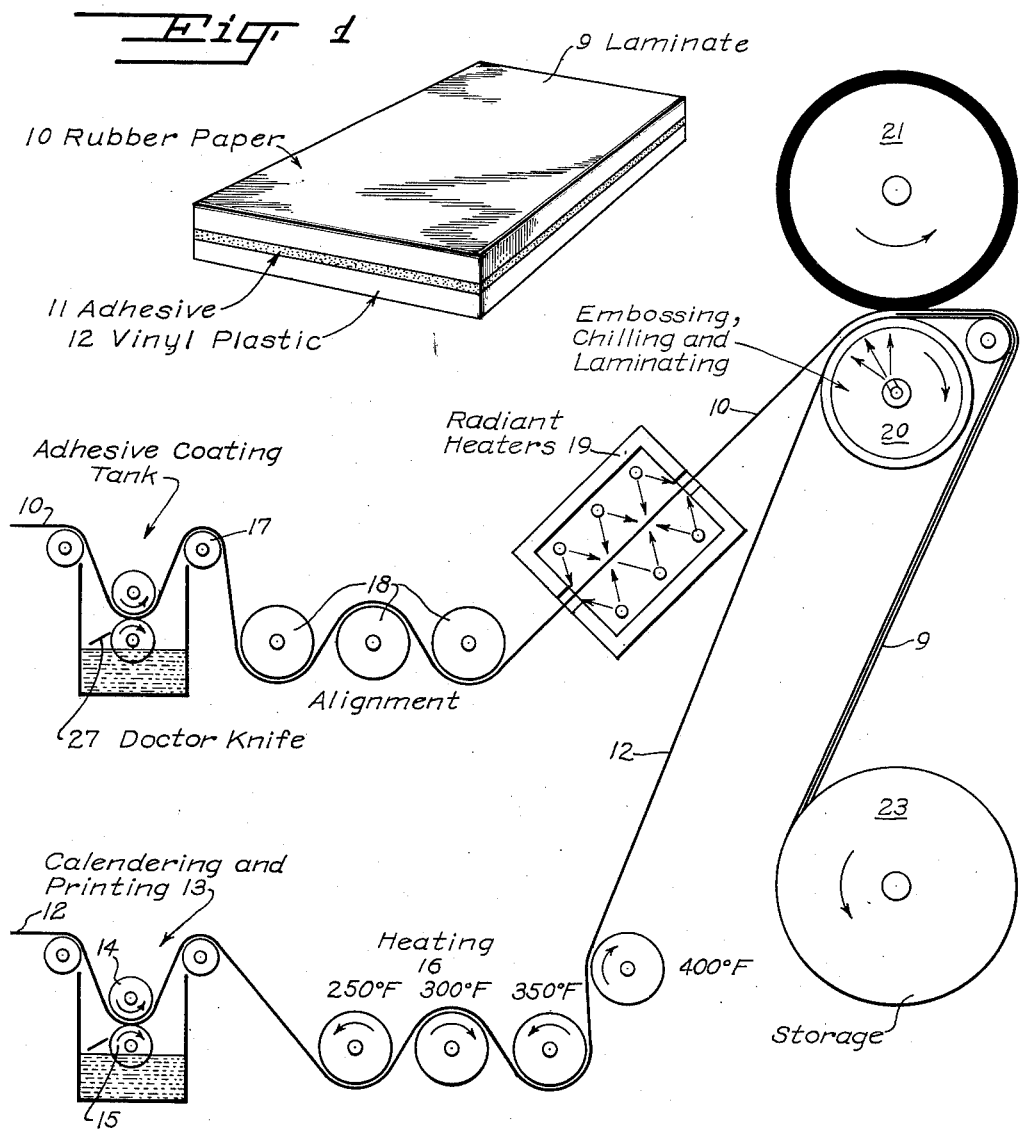
INVENTOR.
Malcolm Seymour
BY
Attorney

United States Patent Office 2,759,866
Patented Aug. 21, 1956

2,759,866

METHOD OF MAKING WALL COVERING

Malcolm Seymour, North Andover, Mass., assignor, by mesne assignments, to The General Tire & Rubber Company, Akron, Ohio, a corporation of Ohio Application December 17, 1952, Serial No. 326,403

1 Claim. (Cl. 154—138)

This invention relates to a laminated sheeting and a method of making the same. More particularly, the invention relates to a sheeting adapted for use as a wall covering.

With the discovery and development of modern vinyl type resins, manufacturers of rubber articles such as rubber wall covering became interested in the possibility of combining vinyl resins with a rubber type backing to produce a novel wall covering. Vinyl sheetings have particularly desriable properties because of the wide variety of colors that are obtainable, and also because the combination processes of over-printing and embossing may be used. These properties make vinyl sheeting superior to such calender-marbleized materials as linoleum and rubber wall covering. Secondly, vinyl sheetings have desirable chemical advantages in their resistance to oxidation, oils, grease, soaps and cleaning solutions.

In the past numerous attempts were made to apply unsupported vinyl sheeting to wall surfaces by means of ordinary adhesives such as lignin clay pastes, alcohol-cut gum pastes, wallpaper pastes, casein adhesives, and animal glues. However, due to the inertness of the vinyl sheeting, these adhesives were not effective and would not adhere.

Attempts were also made to provide a backing for the vinyl sheeting to make a surface to which ordinary adhesives would adhere. An additional object of such a backing was to provide a smooth surface so that the vinyl sheeting would not show every minute imperfection in the wall.

It has been sugegsted in the prior art to use a rubber-saturated paper or woven fiber as a backing for various sheetings. The saturated paper consisted of cellulose fibers, sheeted into a web, and passed through a bath of natural or synthetic latex so as to impregnate the cellulose fiber web with rubber particles. However, in this process the impregnation is superficial. The rubber is deposited in glomerates around groups of fibers and is not intimately mingled with individual fibers.

An additional difficulty arose in the improper use of plasticizers for vinyl sheetings in which the plasticizer migrated from the vinyl sheeting into the rubber saturant, causing the wall covering material either to curl or to shrink. Finally, besides the curling and shrinkage there occurred a deterioration of the rubber saturant, causing the paper to become gummy and oily. It was found that linoleum paste such as clay-lignin paste could not be used successfully on such rubber-impregnated wall coverings and it was necessary to develop special adhesives based on such ingredients as casein and natural rubber latex or alcohol-cut oxidizing resin pastes. These special adhesives, in all instances more expensive than clay-lignin pastes, are not as widely available.

The primary object of this invention is to provide a superior and novel laminated wall covering material which is an improvement upon, and eliminates the defects of, previously designed wall coverings.

Another object of the invention is to provide an improved vinyl sheeting incorporating a non-migratory plasticizer.

Another object of the invention is to provide an improved paper laminate in which the rubber particles are intimately mixed in the pulp dispersion during the manufacture of the paper itself.

Another object of the invention is to provide a novel vinyl paper laminate having a vinyl chloride-vinyl acetate adhesive to bind the vinyl sheeting to the rubberized paper.

A further object of the invention is to provide a novel method of making the new vinyl plastic-rubber paper laminate in which the vinyl sheeting is calendered and decorated in one operation and later is simultaneously embossed and laminated to an adhesive coated paper web between the nip of a cooled steel roll and a resilient bed roll.

Other objects of the invention and the various advantages and characteristics of the present laminated wall covering and the herein disclosed method of making the same will be apparent from a consideration of the following detailed description.

In the drawings which accompany and form a part of this specification letters and numerals of reference denote corresponding parts through the several views:

Fig. 1 is a perspective view of the laminated sheeting.

Fig. 2 is a schematic view showing the method of making the laminated sheeting from vinyl plastic and rubber paper.

The laminate 9, as best shown in Fig. 1 of the drawing, is sheeting designed to be used as a wall covering and its basic components comprise a first lamina of rubber impregnated paper 10, a second lamina of adhesive 11 coated on said paper, and a third lamina of vinyl plastic sheeting 12.

The paper lamina 10 comprises a paper-rubber composition in which the rubber particles are dispersed in the pulp emulsion during the manufacture of the paper itself. Any conventional type of paper used in the paper making art may be used. A preferred example consists of Alpha pulp, kraft pulp, G. R. S. latex, rubber chemicals, and paper-making chemicals. In the manufacture of the paper, rubber particles are dispersed in the pulp emulsion. G. R. S. latex is the preferred embodiment, but natural rubber or neoprene latex may also be used.

The adhesive 11 is selected from a group of compounds which have heat sealing or thermoplastic characteristics. Among the thermoplastic adhesives are certain vinyl compounds. One example of the preferred composition is as follows:

| | Parts |
|---|---|
| Vinyl resin VYHH | 20 |
| Methylethylketone | 50 |
| Toluol | 30 |

VYHH (Bakelite Corp.) is a copolymer of vinyl acetate-vinyl chloride. It contains 85–88% vinyl chloride and has an average m. w. of 10,000.

The adhesive 11 is applied to the paper 12 in the amount of 2 to 4 grams (dry wt.) per square foot of paper. A new and important use of this vinyl adhesive to bond rubber paper 10 to vinyl plastic 12 is disclosed herein.

The vinyl plastic sheeting 12 is produced in web form in any conventional manner common to the plastic industry. It may consist predominately of any suitable vinyl compound such as polymerized vinyl halides, vinyl esters, or copolymers thereof. In forming the web of vinyl sheeting various desired components may be included in the stock prior to final web formation. Such components may include heat stabilizers, light stabilizers, fire retardants, pigments, and other fillers.

It has been found by me that many of the prior art deficits in vinyl backed sheeting were caused by the use of unsatisfactory plasticizers. Acordingly, in the preferred form of the present invention, the vinyl sheeting has included therein a non-migratory plasticizer.

Non-migratory plasticizers are generally of the polymeric type as distinguished from monomeric. Examples of migratory plasticizers commonly used in vinyl formulation are dioctylphthalate (dop), dioctylsebacate (dos), and various castor oil derivatives, whereas examples of non-migratory plasticizers are Paraplex, G-40, G-50 and G-60 (Rohm and Haas), and poly-propyleneglycol-sebacate.

It has been found that migration of the vinyl plasticizer is particularly troublesome in laminates utilizing vinyl adhesives and a paper lamina having rubber particles incorporated therein. The preferred use of non-migratory plasticizers substantially eliminates formation of wrinkles, inadequate bondage, and plastic sheet cracking common to prior art devices.

A preferred example of a vinyl sheet composition suitable for use in the present invention is as follows:

| | Parts by weight |
|---|---|
| Vinyl resin | 60 |
| Plasticizer | 26 |
| Heat stabilizer | 4 |
| Light stabilizer | 3 |
| Fire retardant | 2 |
| Pigment and filler | 5 |

The method of making this novel wall covering laminate is shown schematically in Fig. 2.

A vinyl plastic is formed into sheeting 12 in any usual manner well known in the art and the web form thereof is calendered and decoratively printed by any usual means such as tank 13, bed roll 14, and engraved steel roll 15. Following this preparatory treatment the vinyl sheeting or lamina 12 is passed over a series of heated rolls 16 having an increasing gradiant of temperature from approximately 250° to 400° F.

The rubber paper is formed by incorporating the rubber particles in the pulp dispersion during the formation of the paper itself. The rubber paper 10 is dried in any conventional manner, and following the preparatory treatment, the rubber paper 10 in web form is treated with a heat-sealable adhesive in adhesive coating tank 17. Excess adhesive in one embodiment is removed by doctor knife 27. Any other conventional method of applying the adhesive may be used.

The rubber paper web is fed over alignment rollers 18 and finally, as close to the nip as possible, the paper 10 is passed between a bank of radiant strip heaters 19 so that the paper is heated to a temperature of from 300° to 400° F.

Plastic web 12 and paper web 10 which, as aforesaid, have been separately heated are brought together between the nip of cooled steel roll 20 and rubber covered roll 21.

The steel embossing roll 20 may have either a smooth, highly polished surface or a grained or textured surface, depending on the exterior surface type desired. Cooling water inside the steel roll or cylinder 20 causes the laminate to cool sufficiently so that the plastic will hold the shape which has been imparted to it by roll 20.

The rubber roll 21 consists of a rubber-covered cylinder of a density of between 40 to 70 Durometer yieldable to force the paper and the heated plastic into intimate contact with the embossing cylinder.

The laminated wall covering web 9 is finally cooled below 220° F. and wound and stored on storage rolls 23. When cooled below 220° F. a union between the vinyl sheet and the paper is stronger than the internal strength of the paper itself.

It is to be understood that the invention is not to be restricted to the details set forth, since these may be modified within the scope of the appended claim without departing from the scope of the invention.

Having thus described the invention, what I claim as new and desire to secure by Letters Patent is:

A method of forming laminated sheeting, comprising coating one surface of a predried rubber paper sheet formed by incorporating rubber particles in the paper pulp dispersion during the formation of the paper with a thin layer of a vinyl chloride-vinyl acetate copolymer adhesive composition, applying a sheet of vinyl resin having a non-migratory plasticizer incorporated therein and heated to between 250° F. and 400° F. to said coated surface, while said coated surface is also heated to between 250° F. and 400° F. and thereafter uniting said sheets by simultaneously applying pressre and a cooling temperature.

References Cited in the file of this patent

UNITED STATES PATENTS

| | | |
|---|---|---|
| 1,731,754 | Richards | Oct. 15, 1929 |
| 2,041,968 | Schur | May 26, 1936 |
| 2,236,766 | Schneider | Apr. 1, 1941 |
| 2,275,957 | Groff | Mar. 10, 1942 |
| 2,306,046 | Duggan et al. | Dec. 22, 1942 |
| 2,415,028 | Bosomworth | Jan. 28, 1947 |
| 2,453,052 | Vanetten | Nov. 2, 1948 |
| 2,473,183 | Watson | June 14, 1949 |
| 2,533,976 | Teague | Dec. 12, 1950 |
| 2,559,649 | Little et al. | July 10, 1951 |
| 2,607,712 | Sturken | Aug. 12, 1952 |
| 2,700,630 | Bukey et al. | Jan. 25, 1955 |